(12) United States Patent
Lee et al.

(10) Patent No.: US 12,510,415 B2
(45) Date of Patent: Dec. 30, 2025

(54) APPARATUS, METHOD, AND COMPUTER-READABLE RECORDING MEDIUM FOR CORRECTING TEMPERATURE OF OBJECT USING SHUTTER

(71) Applicant: U ELECTRONICS CO., LTD., Suwon-si (KR)

(72) Inventors: Joon-Sub Lee, Seoul (KR); Tae-Hwan Eom, Hwaseong-si (KR); Min Kyu Lee, Suwon-si (KR)

(73) Assignee: U ELECTRONICS CO., LTD., Suwon-si (KR)

( * ) Notice: Subject to any disclaimer, the term of this patent is extended or adjusted under 35 U.S.C. 154(b) by 428 days.

(21) Appl. No.: 18/265,803

(22) PCT Filed: Dec. 9, 2020

(86) PCT No.: PCT/KR2020/017950
§ 371 (c)(1),
(2) Date: Jun. 7, 2023

(87) PCT Pub. No.: WO2022/124441
PCT Pub. Date: Jun. 16, 2022

(65) Prior Publication Data
US 2024/0035894 A1 Feb. 1, 2024

(30) Foreign Application Priority Data
Dec. 8, 2020 (KR) .................. 10-2020-0170067

(51) Int. Cl.
*G01J 5/48* (2022.01)
*G01J 5/08* (2022.01)
*H04N 23/23* (2023.01)

(52) U.S. Cl.
CPC ............... *G01J 5/48* (2013.01); *G01J 5/084* (2013.01); *H04N 23/23* (2023.01)

(58) Field of Classification Search
CPC .. G01J 5/48; G01J 5/084; G01J 5/0804; G01J 5/0806; G01J 5/53; G01J 5/80; G01J 5/064; G01J 5/08; H04N 23/23
See application file for complete search history.

(56) References Cited

U.S. PATENT DOCUMENTS 6,830,373 B2 * 12/2004 Lin ..................... G01J 5/064
374/208
2008/0210872 A1 9/2008 Grimberg
(Continued)

FOREIGN PATENT DOCUMENTS

CN 103335722 A 10/2013
CN 104697642 A * 6/2015
(Continued)

*Primary Examiner* — Laura Martin
*Assistant Examiner* — Julia Fitzpatrick
(74) *Attorney, Agent, or Firm* — The Webb Law Firm

(57) ABSTRACT

An apparatus for correcting a temperature of an object using a shutter may comprise a temperature measurement module for measuring the temperature of the object and a temperature of the shutter, a noise temperature calculation module for calculating the temperature due to noise using the measured temperature of the shutter, and a temperature correction module for correcting the temperature of the object by subtracting the calculated temperature due to noise from the measured temperature of the object.

11 Claims, 5 Drawing Sheets

(56) References Cited

U.S. PATENT DOCUMENTS

| | | | |
|---|---|---|---|
| 2009/0272888 A1* | 11/2009 | Nugent | G01D 18/00 |
| | | | 250/252.1 |
| 2010/0237245 A1 | 9/2010 | King et al. | |
| 2011/0068272 A1* | 3/2011 | Dupont | G01J 5/22 |
| | | | 250/340 |
| 2017/0089764 A1 | 3/2017 | Lee et al. | |
| 2017/0160141 A1* | 6/2017 | Yamanaka | G01J 5/0846 |
| 2019/0195694 A1* | 6/2019 | Tang | G01J 5/064 |
| 2019/0331534 A1* | 10/2019 | Tabuchi | G01K 13/00 |
| 2020/0202569 A1 | 6/2020 | Sandsten et al. | |
| 2021/0250524 A1 | 8/2021 | Lee et al. | |

FOREIGN PATENT DOCUMENTS

| | | | | |
|---|---|---|---|---|
| CN | 109443598 A * | 3/2019 | | G01K 15/005 |
| DE | DD-285187 A5 * | 12/1990 | | |
| JP | H05507356 A * | 10/1993 | | G01J 5/0834 |
| JP | H06137952 A * | 5/1994 | | |
| JP | H06258142 A * | 9/1994 | | |
| JP | H06084326 U | 12/1994 | | |
| JP | H9325073 A | 12/1997 | | |
| JP | H10206246 A * | 8/1998 | | G01K 13/00 |
| JP | 2003247889 A | 9/2003 | | |
| JP | 2004356877 A | 12/2004 | | |
| JP | 2007502403 A | 2/2007 | | |
| JP | 2007201807 A | 8/2007 | | |
| JP | 2008145133 A | 6/2008 | | |
| JP | 2015184234 A * | 10/2015 | | |
| JP | 2017126812 A | 7/2017 | | |
| JP | 2019039672 A * | 3/2019 | | |
| KR | 970007314 A * | 2/1997 | | G03G 15/2039 |
| KR | 20080050695 A * | 6/2008 | | H01L 21/67248 |
| KR | 20140122124 A * | 10/2014 | | G01J 5/20 |
| KR | 101833365 B1 | 4/2018 | | |
| KR | 102064582 B1 | 1/2020 | | |
| RU | 2010124690 A * | 12/2011 | | G01K 7/42 |
| WO | WO-0009976 A1 * | 2/2000 | | G01J 5/0003 |
| WO | 2020166939 A1 | 8/2020 | | |

* cited by examiner

APPARATUS, METHOD, AND COMPUTER-READABLE RECORDING MEDIUM FOR CORRECTING TEMPERATURE OF OBJECT USING SHUTTER

CROSS-REFERENCE TO RELATED APPLICATIONS

This application is the United States national phase of International Application No. PCT/KR2020/017950 filed Dec. 9, 2020, and claims priority to Korean Patent Application No. 10-2020-0170067 filed Dec. 8, 2020, the disclosures of which are hereby incorporated by reference in their entireties.

BACKGROUND OF THE INVENTION

Field of the Invention

The present disclosure relates to an apparatus, a method and a computer-readable medium for correcting a temperature of an object using a shutter.

Description of Related Art

A thermal imaging camera is the most widely known device that thermally images a surface of an object and measures temperature distribution thereof, due to advantages thereof such as high spatial resolution and temperature resolution, a non-contact method, and the like.

In order to measure a temperature of an object using such a thermal imaging camera, a curve of a temperature difference with respect to an output code difference is obtained before and after opening a shutter based on a temperature of the shutter, the obtained curve of the temperature difference with respect to the output code difference is approximated to a fitting function of a suitable order, and then the temperature of the object is measured by means of the fitting function.

According to such a prior art, in order to measure a temperature of an object, it is necessary to measure a temperature of a shutter. However, since it is substantially impossible to mount a temperature sensor on the shutter, a temperature measured by means of a temperature sensor mounted on a board is taken as being a temperature of the shutter.

However, there is a difference between the temperature of the board and an actual temperature of the shutter, resulting in a problem in which a precision is degraded in a case of measuring a body temperature to be measured with a high accuracy, in particular, 0.5 degree or less.

Furthermore, there is a problem in which a temperature of an object is not accurately measured due to noise caused by various factors.

As a related art, there is Korean Patent No. 2064582 ('APPARATUS AND METHOD OF MEASURING TEMPERATURE USING THERMAL IMAGING CAMERA AND COMPUTER READABLE MEDIUM, registered on Jan. 3, 2020).

SUMMARY OF THE INVENTION

Technical Problem

According to an embodiment of the present disclosure, an apparatus, a method and a computer-readable medium for correcting a temperature of an object using a shutter is provided, which can accurately measure the temperature of the object without being affected by noise.

Solution to Problem

According to a first aspect of the present disclosure, a temperature correction apparatus for correcting a temperature of an object using a shutter comprises: a temperature measurement module for measuring the temperature of the object and a temperature of the shutter; a temperature sensor module for measuring a temperature of a board; a noise temperature calculation module for calculating a temperature due to noise using the measured temperature of the shutter, the measured temperature of the board, and a temperature correcting value of the shutter, wherein the temperature correcting value of the shutter is a difference between an actual temperature of the shutter and the measured temperature of the board; and a temperature correction module for correcting the temperature of the object by subtracting the calculated temperature due to noise from the measured temperature of the object.

According to a second aspect of the present disclosure, a temperature correction method for correcting a temperature of an object using a shutter comprises: a first step of, by a temperature measurement module, measuring the temperature of the object and a temperature of the shutter; a second step of, by a temperature sensor module, measuring a temperature of a board; a third step of, by a noise temperature calculation module, calculating a temperature due to noise using the measured temperature of the shutter, the measured temperature of the board, and a temperature correcting value of the shutter, wherein the temperature correcting value of the shutter is a difference between an actual temperature of the shutter and the measured temperature of the board; and a fourth step of, by a temperature correction module, correcting the temperature of the object by subtracting the calculated temperature due to noise from the measured temperature of the object.

According to a second aspect of the present disclosure, a computer-readable recording medium, recording a program for executing the temperature correction method on a computer, is provided.

Advantageous Effects of Invention

According to an aspect of the present disclosure, by obtaining a temperature due to noise using a temperature of a shutter, and subtracting the temperature due to noise from a measured temperature of an object so as to correct the measured temperature of the object, the temperature of the object can be accurately measured.

DETAILED DESCRIPTION

Figure 1:
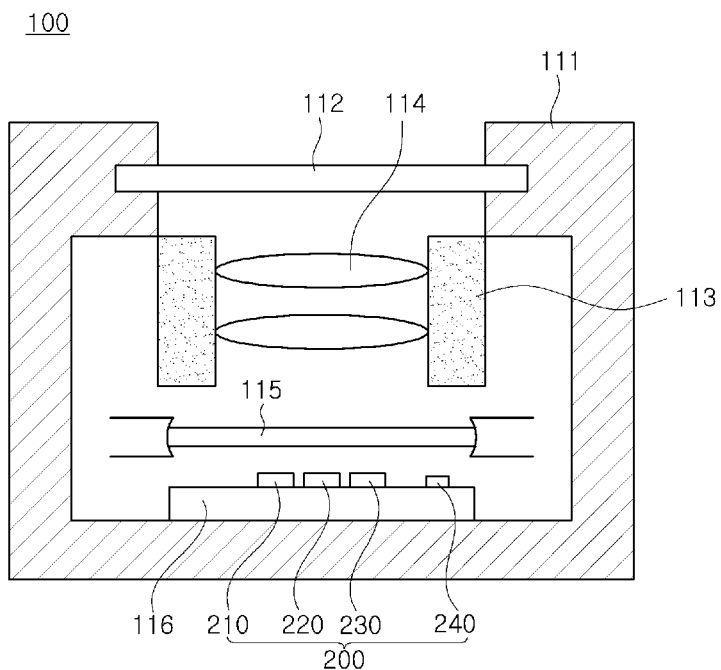
FIG. 1 is a view illustrating a thermal imaging camera comprising a temperature measurement apparatus according to an embodiment of the present disclosure.

Hereinafter, embodiments in the present disclosure will be described hereinafter with reference to the accompanying drawings. The disclosure may, however, be modified in many different forms and should not be construed as being limited to the specific embodiments set forth hereinafter. In the drawings, the shapes and dimensions of elements may be exaggerated for clarity, and the same reference numerals will be used throughout to designate the same or like elements.

FIG. 1 is a view illustrating a thermal imaging camera 100 comprising a temperature correction apparatus according to an embodiment of the present disclosure.

As shown in FIG. 1, a thermal imaging camera 100 may include a housing 111, an IR window 112 provided on an upper portion of the housing 111, a barrel 113, a plurality of lenses 114 provided inside the barrel 113, a shutter 115, a board 116, and a temperature correction apparatus 200 provided on the board 116.

The aforementioned temperature correction apparatus 200 may include a temperature measurement module 210 for measuring a temperature of an object and a temperature of a shutter, a temperature sensor module 240 provided on the board 116 for measuring a temperature of the board 116, a noise temperature calculation module 220 for calculating a temperature due to noise using the measured temperature of the shutter, the measured temperature of the board, and a temperature correcting value of the shutter, and a temperature correction module 230 for correcting the temperature of the object by subtracting the calculated temperature due to noise from the measured temperature of the object. The temperature correcting value of the shutter may be a difference between an actual temperature of the shutter and the measured temperature of the board.

Specifically, the temperature measurement module 210 may measure the temperatures of the object and the shutter. The measured temperatures of the object and the shutter may be communicated to the noise temperature calculation module 220 and the temperature correction module 230. The configurations and the operations of the temperature measurement module 210 will be described later with reference to FIGS. 2 to 5 and 7.

The temperature sensor module 240 may be provide on the board 116 and measure the temperature of the board 116. The measured temperature of the board 116 may be communicated to the temperature measurement module 210 and the noise temperature calculation module 220.

In the meantime, the noise temperature calculation module 220 may use the measured temperature of the shutter, the measured temperature of the board, and the temperature correcting value of the shutter and calculate the temperature due to noise, according to the following Equation 1:

$$Tnoise = Tsm - (Tsg + \Delta Ts) \quad \text{[Equation 1]}$$

where Tnoise denotes the temperature due to noise, Tsm denotes the measured temperature of the shutter, Tsg denotes the measured temperature of the board, ΔTs denotes the temperature correcting value of the shutter, and the temperature correcting value of the shutter is a difference between the actual temperature of the shutter and the temperature of the board.

As explained in the Background Art section, it is substantially impossible to mount a temperature sensor on the shutter 115. Therefore, according to an embodiment of the present disclosure, the temperature of the board 116 measured in the temperature sensor module 240 mounted on the board 116 is inferred (assumed) as the temperature of the shutter 115, so the temperature correcting value, which is a difference between the actual temperature of the shutter and the measured temperature of the board, is absolutely necessary in measuring the temperature of the object.

In the meantime, as described in the following Equation 2, the measured temperature of an object (where the object is a black body (a black body source) whose temperature is known or a heating element having a known temperature) and the measured temperature of the shutter may include respective temperature components Tnoise due to noise having the same magnitude. The temperature of the object and the temperature of the shutter may be temporally continuously measured so as to obtain the respective temperature components due to noise having the same magnitude:

$$Tsm = Tsg + Tnoise + \Delta Ts$$

$$Tbsm = Tbs + Tnoise \quad \text{[Equation 2]}$$

That is, the measure temperature Tsm of the shutter may include the temperature Tsg of the board 116, which is inferred as the temperature of the shutter 115, the temperature Tnoise due to noise, and the temperature correcting value ΔTs. Similarly, the temperature Tbsm of the black body may include the actual temperature Tbs of the black body and the temperature Tnoise due to noise.

In particular, the temperature Tnoise due to noise described in Equation 1 may be obtained from the first equation of Equation 2 above.

In the meantime, the temperature correcting value ΔTs of the shutter in Equation 1 may be obtained from the following Equation 3. Equation 3 is an equation of ΔTs resulting from Equation 3:

$$\Delta Ts = (Tsm - Tsg) - (Tbsm - Tbs) \quad \text{[Equation 3]}$$

where ΔTs denotes the temperature correcting value of the shutter, Tsm may denote the measured temperature of the shutter, Tsg may denote the measured temperature of the board, Tbsm may denote the measured temperature of the black body, and Tbs may denote the known temperature of the black body. Tbsm may denote a temperature measured after positioning the black body (or heating element) having the known temperature Tbs in front of a thermal imaging camera.

That is, the temperature correcting value ΔTs of the shutter may be a difference between the actual temperature of the shutter and the temperature of the board, or obtained by means of Equation 3. This temperature correcting value ΔTs of the shutter may be a value previously obtained in advance.

Finally, the temperature correction module 230 may obtain the actual temperature of the object by correcting the temperature of the object by subtracting the calculated temperature due to noise from the measured temperature of the object, according to the following Equation 4:

$$Tt = Ttm - Tnoise \quad \text{[Equation 4]}$$
$$= Ttm - (Tsm - (Tsg + \Delta Ts))$$

where Tt is the actual temperature of the object (a corrected temperature of the object), Ttm denotes the measured temperature of the object, Tnoise denotes the temperature due to noise, Tsm denotes the temperature of the shutter, Tsg denotes the measure temperature of the board, and ΔTs is the temperature correcting value of the shutter.

Figure 2:
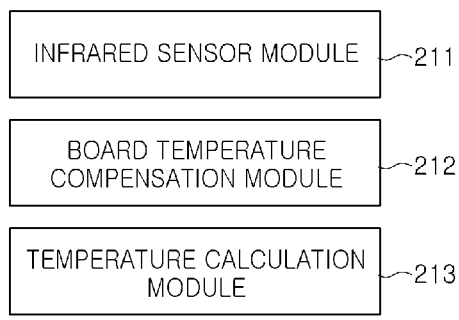
FIG. 2 is an internal block diagram of a temperature measurement module according to an embodiment of the present disclosure.

In the meantime, FIG. 2 is an internal block diagram of a temperature measurement module according to an embodiment of the present disclosure, and a temperature measurement module 210 may include an infrared sensor module 211, a board temperature compensation module 212 and a temperature calculation module 213.

Specifically, the infrared sensor module 211 of the temperature measurement module 210 is a module for providing an output voltage due to infrared irradiated by the object or the shutter, and may include an infrared sensor, but is not limited thereto. Hereinafter, the infrared sensor module 211 is described with reference to FIG. 2.

Figure 3:
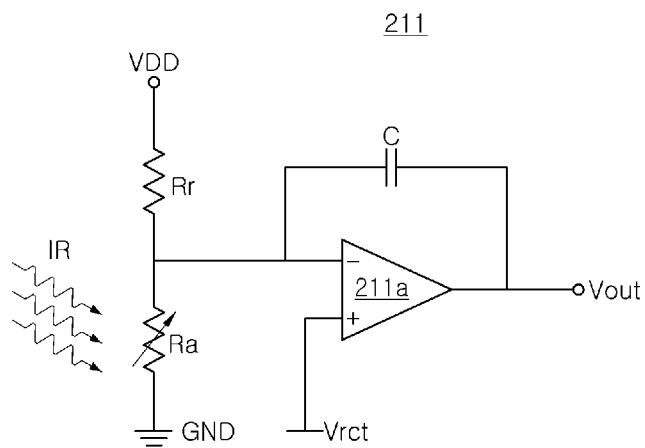
FIG. 3 is a circuit diagram of an infrared sensor module according to an embodiment of the present disclosure.

FIG. 3 is a circuit diagram of an infrared sensor module 211 according to an embodiment of the present disclosure.

As shown in FIG. 3, the infrared sensor module 211 may be configured to include a first bias power supply VDD for supplying a first bias voltage, a second bias power supply Vrct for supplying a second bias voltage having a magnitude less than a magnitude of the first bias voltage, a reference cell Rr having one end serially connected to the first bias power supply VDD, an active cell Ra having one end connected to the other end of the reference cell Rr and the other end connected to a ground GND, and an integrator 211a including a capacitor C for providing an output voltage obtained by integrating an increased amount of current flowing through the active cell Ra, wherein a negative terminal of the integrator 211a is connected to a connection node of the reference cell Rr and the active cell Ra, and a positive terminal of the integrator 211a is connected to the second bias power supply Vrct.

The first bias voltage and the second bias voltage described above have magnitudes causing the output voltage Vout to be predetermined voltages at a reference temperature Tpcb_ref of the board and a reference temperature Tb_ref of the black body. Furthermore, the magnitude of the second bias voltage described above is a half of the magnitude of the first bias power supply VDD, or the magnitude of the second bias power supply Vrct is a value within a certain range from a half of the magnitude of the first bias power supply VDD. The reason for applying bias power supplies having fixed magnitudes is for providing stable power supply to a sensor.

The reference cell Rr described above may have a certain resistance value, and the active cell Ra may be an element having a resistance value varying with incident infrared IR.

The integrator 211a described above may generate an output signal (for example, a voltage) by integrating an increased amount of current flowing through the active cell Ra as the resistance value of the active cell Ra decreases.

Specifically, the integrator 211a may have a connection structure in which the negative terminal is connected to the connection node of the reference cell Rr and the active cell Ra, the second bias power supply Vrct is applied to the positive terminal, and the capacitor C is connected between the negative terminal and an output terminal.

Referring to FIG. 3, when the infrared is irradiated, the resistance value of the active cell Ra decreases, and the bias power supplies VDD and Vrct may be applied in order to read such a variation of the resistance value in a form of a voltage. The magnitudes of applied bias power supplies VDD and Vrct may use the values stored when obtaining a first function, as will be described below.

As the resistance value of the active cell Ra decreases, the current flowing through the active cell Ra increase, and the amount of the current flowing through the active cell Ra may be integrated by the integrator 211 during a certain time interval, thereby generating the output signal Vout.

In order to help the understating of the present disclosure, only one reference cell Rr and one active cell Ra are illustratively shown in FIG. 3. However, there may be at least two active cells Ra, and it will be apparent to those skilled that each of the active cells Ra may be connected to the reference cell Rr via a switch (not shown).

In the meantime, the board temperature compensation module 212 of the temperature measurement module 210 may compensate the output voltage Vout provided by the infrared sensor module 211 with an output voltage at the reference temperature Tpcb_ref of the board 116, by using a first function (please refer to Equation 5 below) of an output voltage Vout with respect to a temperature Tpcb of the board 116 obtained at a reference temperature Tb_ref of the black body.

In the meantime, the first function described above may be a function obtained by curve-fitting the output voltage Vout with respect to the temperature Tpcb of the board 116 measured in a state that the temperature of the black body (not shown) is fixed to the reference temperature Tb_ref of the black body.

Hereinafter, a process for obtaining the first function of the output voltage Vout with respect to the temperature Tpcb of the board will be described in detail.

First, in a state that the temperature Tpcb of the board 116 is maintained at the reference temperature Tpcb_ref (for example, 25° C.), after positioning a black body (not shown) having a reference temperature Tb_ref (for example, 40° C.) in front of the thermal imaging camera 100, the bias voltages VDD and Vcrt causing the output voltage Vout to be a desired voltage, for example, 0.9 V, are stored, while varying the bias voltages VDD and Vcrt.

Then, the stored bias voltages VDD and Vcrt are applied, and the output voltages Vout, for example Vout1, Vout2 and Vout3, are stored while varying the temperature Tpcb of the board 116 to Tpcb1, Tpcb2 and Tpcb3, respectively, in a state that the black body (not shown) having the reference temperature Tb_ref (for example, 40° C.) is positioned in front of the thermal imaging camera 100.

Then, the first function of the output voltage Vout with respect to the temperature Tpcb of the board may be obtained by curve-fitting the temperatures of the board and the output voltages (curve-fitting Tpcb1–Vout1, Tpcb2–Vout2 and Tpcb3–Vout3).

Figure 4:
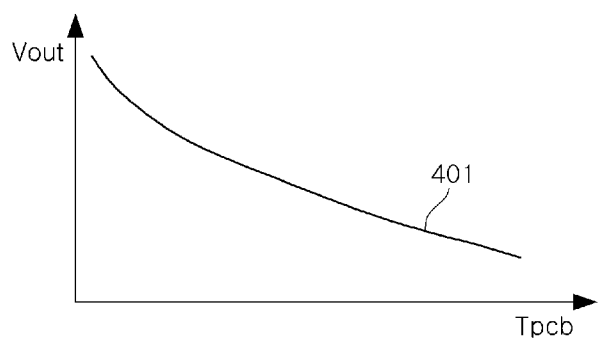
FIG. 4 is a view showing a curve obtained by curve-fitting an output voltage with respect to a temperature of the board obtained at a reference temperature of a black body according to an embodiment of the present disclosure.

Note that the first function, for example, may be a quadric function as shown the following Equation 1, but is not necessarily limited to a quadric function. A curve 401 obtained according to the above may be shown as shown in FIG. 4.

$$\mathrm{Vout}(Tpcb) = 2.3125 + 0.05 \times Tpcb - 0.0025 \times Tpcb^2 \quad \text{[Equation 5]}$$

where Vout(Tpcb) may denote the output voltage when the temperature of the board is Tpcb, and Tpcb may denote the temperature of the board. Equation 1 described above may be obtained when the temperature Tb of the black body is the reference temperature Tb_ref.

More specifically, the board temperature compensation module 212 may compensate the provided output voltage Vout with an output voltage at the reference temperature Tpcb_ref of the board 116, by subtracting a variation of the output voltage according to a difference between the temperature Tpcb of the board 116 and the reference temperature Tpcb_ref of the board 116 from the output voltage Vout provided by the infrared sensor module 211, according to the following Equation 6.

$$Voutc = Vout - (Vout(Tpcb) - Vout(Tpcb\_ref)) \quad \text{[Equation 6]}$$

where Voutc denotes the compensated output voltage, Vout denotes the output voltage provided by the infrared sensor module in a state that the object is positioned, and Vout(Tpcb) and Vout(Tpcb_ref) are the output voltages obtained by putting Tpcb and Tpcb_ref to Equation 1 described above. The aforementioned variation of the current is (Vout(Tpcb)−Vout(Tpcb_ref)).

In the meantime, the temperature calculation module 213 of the temperature measurement module 210 may obtain the temperatures of the object and the shutter from the compensated output voltage Voutc compensated by the board temperature compensation module 212, by using a second function (please refer to Equation 7 below) of the temperature Tb of the black body with respect to the output voltage Vout obtained at the reference temperature Tpcb_ref of the board 116.

That is, the temperature calculation module 213 may obtain the temperature of the object by putting the compensated output voltage Voutc to Vout, the variable of the second function (please refer to Equation 7 below) of the temperature Tb of the black body with respect to the output voltage Vout obtained at the reference temperature Tpcb_ref of the board 116.

The second function describe above may be a function obtained by curve-fitting the temperature Tpcb of the black body with respect to the output voltage Vout provided in a state that the temperature of the board 116 is fixed to the reference temperature Tpcb_ref.

Hereinafter, a process for obtaining the second function of the temperature of the black body with respect to the output voltage will be described in detail.

First, the bias voltages VDD and Vrct stored above are applied to the infrared sensor module 211, and the output voltages Vout, for example Vout1, Vout2 and Vout3, are stored while varying the temperature Tb of the black body positioned in front of the thermal imaging camera 100 to Tb1, Tb2 and Tb3, respectively, in a state of maintaining the temperature Tpcb of the board 116 at the reference temperature Tpcb_ref (for example, 25° C.)

Then, the second function may be obtained by curve-fitting the temperatures Tb of the black body with respect to the output voltages Vout (curve-fitting of Vout1−Tb1, Vout2−Tb2 and Vout3−Tb3).

Figure 5:
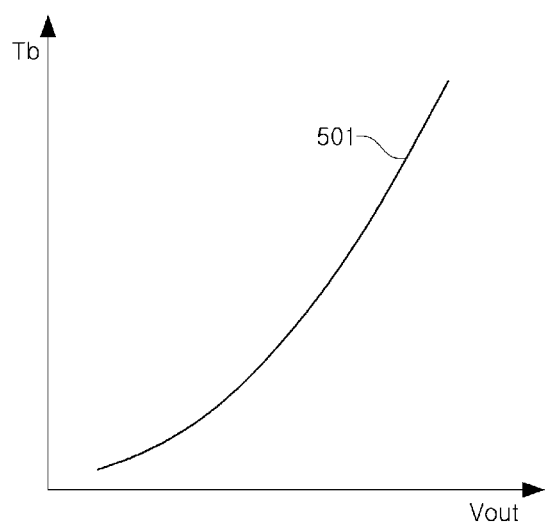
FIG. 5 is a view showing a curve obtained by curve-fitting a temperature of a black body with respect to an output voltage obtained at a reference temperature of the board according to an embodiment of the present disclosure.

Note that the second function, for example, may be a quadric function as shown the following Equation 3, but is not necessarily limited to a quadric function. A curve 501 obtained according to the above may be shown as shown in FIG. 5.

$$Tb(Vout) = -180 + 176.667 \times Vout - 33.3333 \times Vout^2 \quad \text{[Equation 7]}$$

where Tb(Vout) may denote the temperature of the black body, and Vout may denote the output voltage.

As described above, according to an embodiment of the present disclosure, by obtaining a temperature due to noise using a temperature of a shutter, and subtracting the temperature due to noise from a measured temperature of an object so as to correct the measured temperature of the object, the temperature of the object can be accurately measured.

Figure 6:
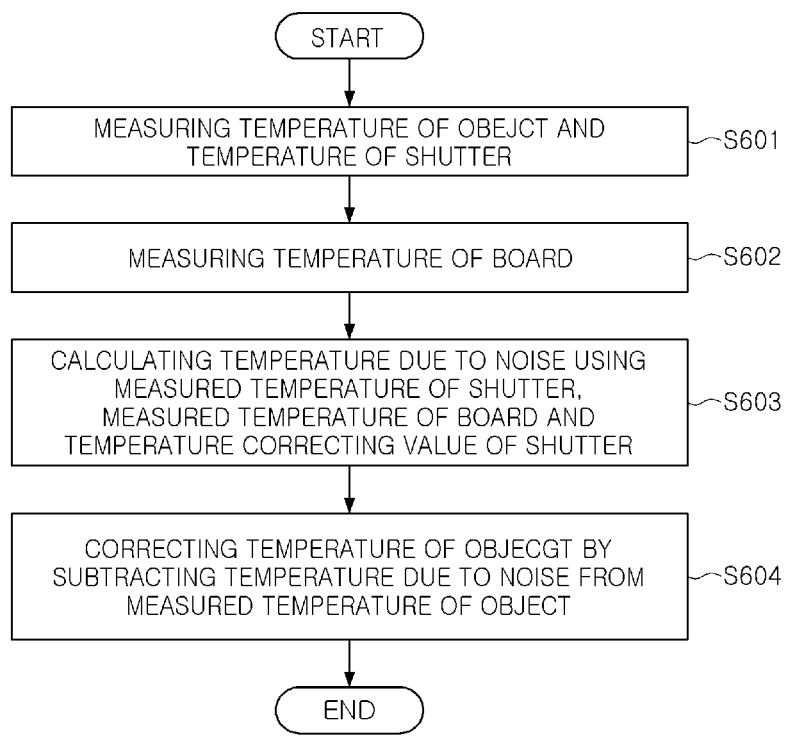
FIG. 6 is a flow chart describing a method for correcting a temperature of an object using a shutter according to an embodiment of the present disclosure.

In the meantime, FIG. 6 is a flow chart describing a method for correcting a temperature of an object using a shutter according to an embodiment of the present disclosure. Hereinafter, a method for correcting a temperature of an object using a shutter according to an embodiment of the present disclosure will be described with reference to FIGS. 1 to 6. However, for simplicity of the present disclosure, the descriptions overlapping with those described in FIG. 1 will be omitted.

Figure 7:
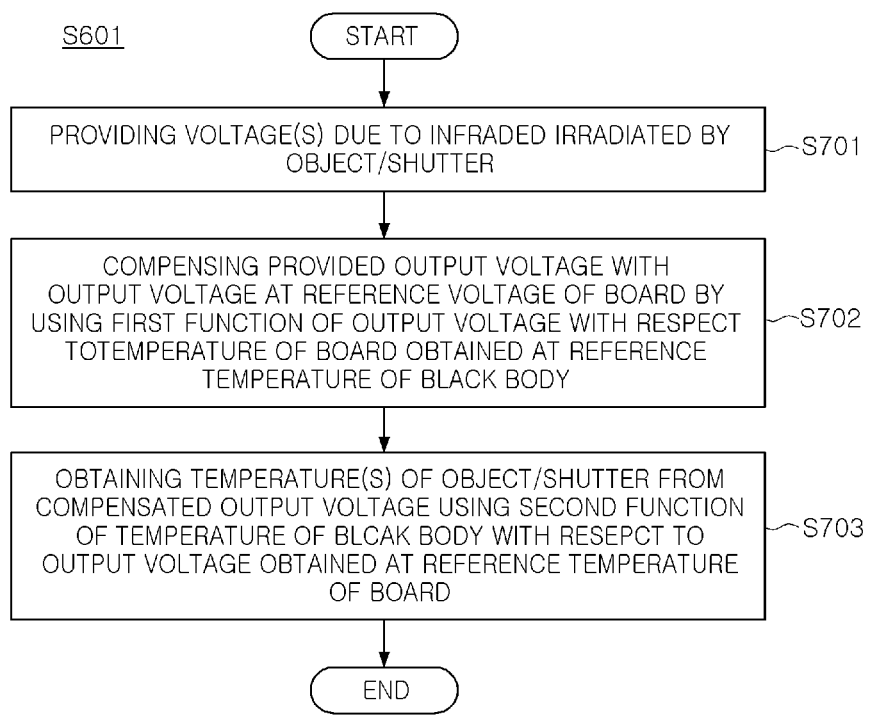
FIG. 7 is a flow chart describing a method for measuring a temperature according to an embodiment of the present disclosure.

As shown in FIGS. 1 and 7, a method for correcting a temperature of an object using a shutter according to an embodiment of the present disclosure may star with a step of measuring the temperature of the object and a temperature of the shutter, by the temperature measurement module 210 (S601). The measured temperatures of the object and the shutter may be communicated to the noise temperature calculation module 220 and the temperature correction module 230.

Next, a temperature sensor module 240 may be provided on a board 116, and measure a temperature of the board 116 (S602).

Next, a noise temperature calculation module 220 may calculate a temperature due to noise using the measured temperature of the shutter, the measured temperature of the board, and a temperature correcting value of the shutter, according to Equation 1 described above. Here, the temperature correcting value of the shutter is a difference between an actual temperature of the shutter and the measured temperature of the board, as described above.

Finally, a temperature correction module 230 may correct the temperature of the object by subtracting the calculated temperature due to noise from the measured temperature of the object according to Equation 1, so as to obtain an actual temperature of the object (S604).

In the meantime, FIG. 7 is a flow chart describing a method for measuring a temperature according to an embodiment of the present disclosure, and embodies step S601 of FIG. 6.

Hereinafter, a method for measuring temperatures of an object and a shutter according to an embodiment of the present disclosure will be described with reference to FIGS. 1 to 4 and 7. However, for simplicity of the present disclosure, the descriptions overlapping with those described in FIGS. 1 to 4 will be omitted.

As shown in FIGS. 1 to 4 and 7, the infrared sensor module 211 may provide an output voltage due to infrared irradiated by the object or the shutter (S701). The provided output voltage may be communicated to the board temperature compensation module 212.

Next, the board temperature compensation module 212 may compensate the output voltage Vout provided by the infrared sensor module 211 with an output voltage at a reference temperature Tpcb_ref of the board 116, by using the first function of an output voltage Vout with respect to the temperature Tpcb of the board 116 obtained at the reference temperature Tb_ref of a black body (S702).

In the meantime, the first function described above may be a function obtained by curve-fitting the output voltage Vout with respect to the temperature Tpcb of the board 116 measured in a state that the temperature of the black body (not shown) is fixed to the reference temperature Tb_ref of the black body, and a process of obtaining the first function of the output voltage with respect to the temperature Tpcb of the board is as described above.

Finally, the temperature calculation module 213 may obtain the temperature of the object from the output voltage Voutc compensated by the board temperature compensation module 212, by using the second function of the temperature Tb of the black body with respect to the output voltage Vout obtained at the reference temperature Tpcb_ref of the board 116 (S703).

That is, the temperature calculation module 213 may obtain the temperature of the object by putting the compensated output voltage Voutc to Vout, the variable of the second function of the temperature Tb of the black body with respect to the output voltage Vout obtained at the reference temperature Tpcb_ref of the board 116.

The second function describe above may be a function obtained by curve-fitting the temperature Tb of the black body with respect to the output voltage Vout provided in a state that the temperature of the board 116 is fixed to the reference temperature Tpcb_ref, and a process of obtaining the second function of the temperature of the black body with respect to the output voltage is as described above.

As described above, according to an embodiment of the present disclosure, by obtaining a temperature due to noise using a temperature of a shutter, and subtracting the temperature due to noise from a measured temperature of an object so as to correct the measured temperature of the object, the temperature of the object can be accurately measured.

The temperature correction apparatus for correcting a temperature of an object using a shutter according to an embodiment of the present disclosure described above may be manufactured as a program to be executed in a computer and stored in a computer-readable recording medium. As examples of computer-readable recording media, ROM, RAM, CD-ROM, a magnetic tape, a floppy disk, an optical data storage device, and the like may be included. In addition, the computer-readable recording medium may be distributed over a computer system connected through a network, so that computer-readable codes may be stored and executed in a distributed manner. Functional programs, codes, and code segments for implementing the method may be easily inferred by programmers in the art to which the present disclosure belongs.

In addition, in describing the present disclosure, '~module' may be implemented by various methods, for example, a processor, program commands performed by the processor, a software module, a microcode, a computer program product, a logic circuit, an application-specific integrated circuit, a firmware, and the like.

While example embodiments have been shown and described above, it will be apparent to those skilled in the art that modifications and variations could be made without departing from the scope of the present disclosure as defined by the appended claims.

The invention claimed is:

1. A temperature correction apparatus for correcting a temperature of an object using a shutter, comprising:
    a temperature measurement module for measuring the temperature of the object and a temperature of the shutter;
    a temperature sensor module for measuring a temperature of a board;
    a noise temperature calculation module for calculating a temperature due to noise using the measured temperature of the shutter, the measured temperature of the board, and a temperature correcting value of the shutter, wherein the temperature correcting value of the shutter is a difference between an actual temperature of the shutter and the measured temperature of the board; and
    a temperature correction module for correcting the temperature of the object by subtracting the calculated temperature due to noise from the measured temperature of the object.

2. The temperature correction apparatus of claim 1, wherein the noise temperature calculation module calculates the temperature due to noise according to the following equation:

$$Tnoise = Tsm - (Tsg + \Delta Ts)$$

where Tnoise denotes the temperature due to noise, Tsm denotes the measured temperature of the shutter, Tsg denotes the measured temperature of the board, and ΔTs denotes the temperature correcting value of the shutter.

3. The temperature correction apparatus of claim 2, wherein the temperature correcting value of the shutter is obtained according to the following equation:

$$\Delta Ts = (Tsm - Tsg) - (Tbsm - Tbs)$$

where Tsm denotes the measured temperature of the shutter, Tsg denotes the measured temperature of the board, Tbsm is a measured temperature of a black body, and Tbs denotes a known temperature of the black body.

4. The temperature correction apparatus of claim 1, wherein the temperature measurement module comprises:
    an infrared sensor module for providing an output voltage due to infrared irradiated by the object or the shutter;
    a board temperature compensation module for compensating the provided output voltage with an output voltage at a reference temperature of the board, by using a first function of the output voltage with respect to a temperature of the board obtained at a reference temperature of a black body; and
    a temperature calculation module for obtaining the temperature of the object or the shutter from the compensated output voltage, by using a second function of a temperature of the black body with respect to the output voltage obtained at a reference temperature of the board.

5. The temperature correction apparatus of claim 4, wherein the board temperature compensation module compensates the provided output voltage with the output voltage at the reference temperature of the board using the first function, by subtracting a variation of the output voltage according to a difference between the measured temperature of the board and the reference temperature of the board from the provided output voltage.

6. The temperature correction apparatus of claim 4, wherein the first function is a function obtained by curve-fitting the output voltage with respect to the temperature of the board measured in a state in which the temperature of the black body is fixed to the reference temperature of the black body.

7. The temperature correction apparatus of claim 4, wherein the second function is a function obtained by curve-fitting the output voltage with respect to the temperature of the board measured in a state in which the temperature of the board is fixed to the reference temperature of the board.

8. The temperature correction apparatus of claim 4, wherein the infrared sensor module comprises:
    a first bias power supply for supplying a first bias voltage;

a second bias power supply for supplying a second bias voltage having a magnitude less than a magnitude of the first bias voltage;

a reference cell having one end serially connected to the first bias power supply;

an active cell having one end connected to the other end of the reference cell and the other end connected to a ground; and an integrator for providing the output voltage obtained by integrating an increased amount of current flowing through the active cell, wherein a negative terminal of the integrator is connected to a connection node of the reference cell and the active cell, and a positive terminal of the integrator is connected to the second bias power supply.

9. The temperature correction apparatus of claim 8, wherein the first bias voltage and the second bias voltage have magnitudes causing the output voltage to be predetermined values at the reference temperature of the board and the reference temperature of the black body.

10. A temperature correction method for correcting a temperature of an object using a shutter, comprising:

a first step of, by a temperature measurement module, measuring the temperature of the object and a temperature of the shutter;

a second step of, by a temperature sensor module, measuring a temperature of a board;

a third step of, by a noise temperature calculation module, calculating a temperature due to noise using the measured temperature of the shutter, the measured temperature of the board, and a temperature correcting value of the shutter, wherein the temperature correcting value of the shutter is a difference between an actual temperature of the shutter and the measured temperature of the board; and a fourth step of, by a temperature correction module, correcting the temperature of the object by subtracting the calculated temperature due to noise from the measured temperature of the object.

11. A computer-readable recording medium, recording a program for executing the temperature correction method of claim 10.

* * * * *